United States Patent [19]

de Wilde et al.

[11] 4,080,954

[45] Mar. 28, 1978

[54] SOLAR COLLECTOR APPARATUS

[76] Inventors: Gerrit de Wilde, A. E. Thurston, Rt. 4, Eugene, Oreg. 97405; Gunther Weiss, 2025 S. W. Briggs Ct., Beaverton, Oreg. 97005

[21] Appl. No.: 679,664

[22] Filed: Apr. 23, 1976

[51] Int. Cl.² .............................................. F24J 3/02
[52] U.S. Cl. .................................. 126/270; 126/271; 237/1 A; 165/180
[58] Field of Search ............... 126/270, 271; 237/1 A; 65/DIG. 9, DIG. 11; 165/82, 180; 215/12 R; 138/108, 112, 113, 114, 103

[56] References Cited

U.S. PATENT DOCUMENTS

| 980,505 | 1/1911 | Emmet | 126/271 |
|---|---|---|---|
| 1,068,650 | 6/1913 | Harrison | 126/271 |
| 2,205,378 | 6/1940 | Abbot | 126/271 |
| 2,460,482 | 2/1949 | Abbot | 126/271 |
| 2,475,544 | 7/1949 | Del Cueto | 165/180 X |
| 2,994,318 | 8/1961 | Lee | 126/270 |
| 3,227,153 | 1/1966 | Godel et al. | 126/271 |
| 3,490,996 | 1/1970 | Kelly, Jr. | 60/641 X |
| 3,952,724 | 4/1976 | Pei | 126/271 |
| 3,957,029 | 5/1976 | Nozik et al. | 126/270 |

Primary Examiner—William F. O'Dea
Assistant Examiner—Larry Jones
Attorney, Agent, or Firm—Clarence A. O'Brien; Harvey B. Jacobson

[57] ABSTRACT

Solar collector apparatus comprising a panel of series connected all glass solar tubes, each tube having an outer evacuated glass cylindrical jacket with a half circular concave cylindrical reflector on its inner surface, blackened heat absorption glass tubing within the jacket secured by glass connection support means to the jacket in an offset position to lie in the focal plane of the reflector, and circulating fluid storing the energy within the heat absorption tubes.

7 Claims, 6 Drawing Figures

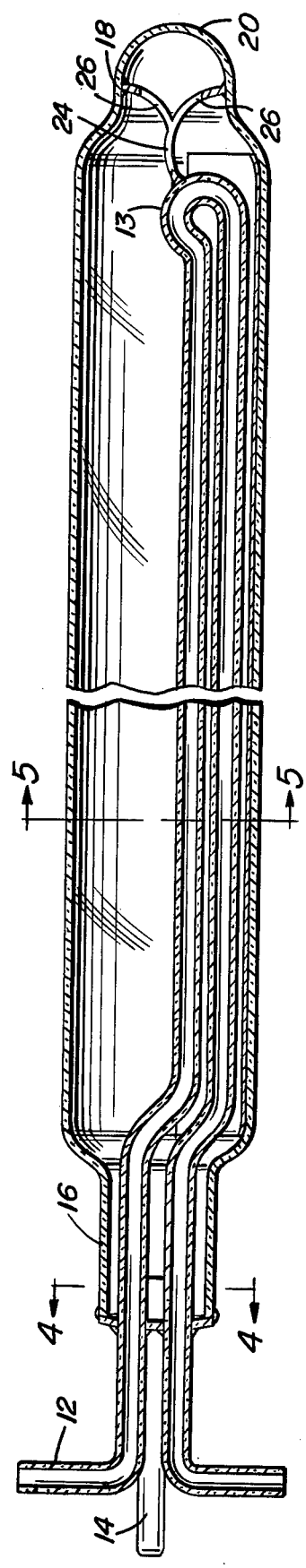
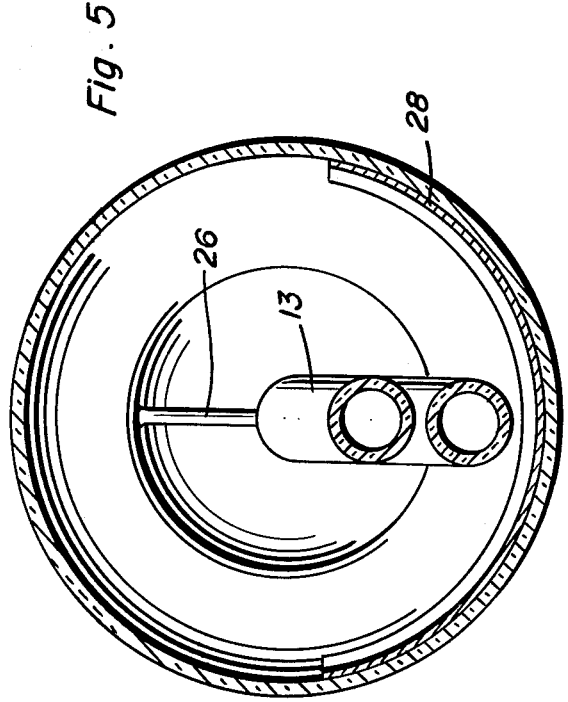
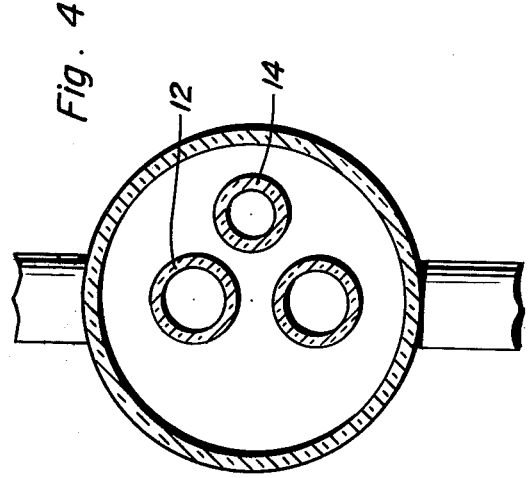

SOLAR COLLECTOR APPARATUS

BACKGROUND OF THE INVENTION

1. Field of the Invention

Solar energy collecting devices are of two types, those with movable parts which track the sun and flat plate collectors. The latter have presented a problem in that it was hitherto necessary for their components to be individually designed and crafted, adding appreciably to the cost. Present day technology in the glass industry would now allow for mass production.

The prime problem associated with solar collectors has been the efficient retention of heat energy or stated conversly the prevention of heat loss. Heat loss occurs in three ways, by convection, by conduction and by radiation. The first means of heat transference, convection, can be eliminated by evacuating the ambient surrounding the heat absorption means. Conduction can be appreciably reduced by eliminating the use of good heat conductors such as metals, and the interfacing of materials with different levels of heat conductivity.

The refocusing of scattered radiation by the concave mirrored surface of the jacket and by the one way reflector coating on the remainder of the inner surface of the jacket, so that it is directed on the blackened heat absorption means, further aids in reducing heat loss. The evacuated ambient reduces deterioration of the mirror, and the efficiency of the blackening means increase heat absorption.

2. Description of the Prior Art

The Abbott U.S. Pat. No. 1,946,184 which discloses a collector designed to move with the sun, having an outer hollow glass highly evacuated tubular body with a blackened copper tube for heat absorption and circulation, in the line focus of an outside parabolic reflector.

The U.S. Pat. No. 2,872,915 to Bowen discloses the use of a secondary transparent reflector opposite the primary reflector to retain the heat waves which bounce off the primary reflector within the collector.

The patent to Godel et al, U.S. Pat. No. 3,227,153, discloses a flat plate collector having a glass evacuated cylinder with heat collecting tubes secured as by metal support and positioning means to the cylinder.

SUMMARY OF THE INVENTION

It is the primary object of the present invention to provide a collector which is capable of mass production, relatively low in cost, durable and which generates the most heat for the available solar radiation. Particular care has been given to design a solar collector suitable for use in cloudy and cool climes with a minimum of heat loss. A practical collector should act as a one way heat trap, energy should flow uni-directionally into the system and not radiate back out. The present collector has been designed wholly of borosilicate glass presenting no interfaces of differing materials with different rates of heat conductivity and its attendent heat loss. The all glass collector is capable of being mass produced and has high evacuation and insulating capabilities which will withstand long periods of cold and cloudy weather.

There is an ancillary benefit derived from the use of an all glass collector, namely it solves one of the most urgent of collector problems, corrosion. Corrosion has been a formidable problem in this art both from exposure to the elements which requires elaborate shielding, and from the circulation of the fluids within the collecting tubes. Corrosion has necessitated premature and costly replacement of parts in the collectors.

The present evacuated tubular solar thermal collector has many unique features among which are that it is constructed entirely of glass with the exception of the aluminized reflective surface. This construction eliminates heat losses attendent with metal-fluid interfaces. Additionally, glass to metal seals are not as strong as glass seals. An all glass construction alleviates expansion problems in a system in which the inner and outer tubes will be at varying temperatures in a high vacuum.

The use of a high vacuum virtually eliminates convection and the use of glass minimizes conduction. In effect, the operating efficiency of the collector is independent of the outside temperature, which is particularly important in cold climates.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a cross-sectional view taken on line 3—3 of FIG. 2.

FIG. 4 is a cross-sectional view taken on line 4—4 of FIG. 3 through the neck of the collector tube jacket.

FIG. 5 is a cross-sectional view taken through the main cylindrical portion of the collector tube jacket.

DESCRIPTION OF THE PREFERRED EMBODIMENT

Figure 1:
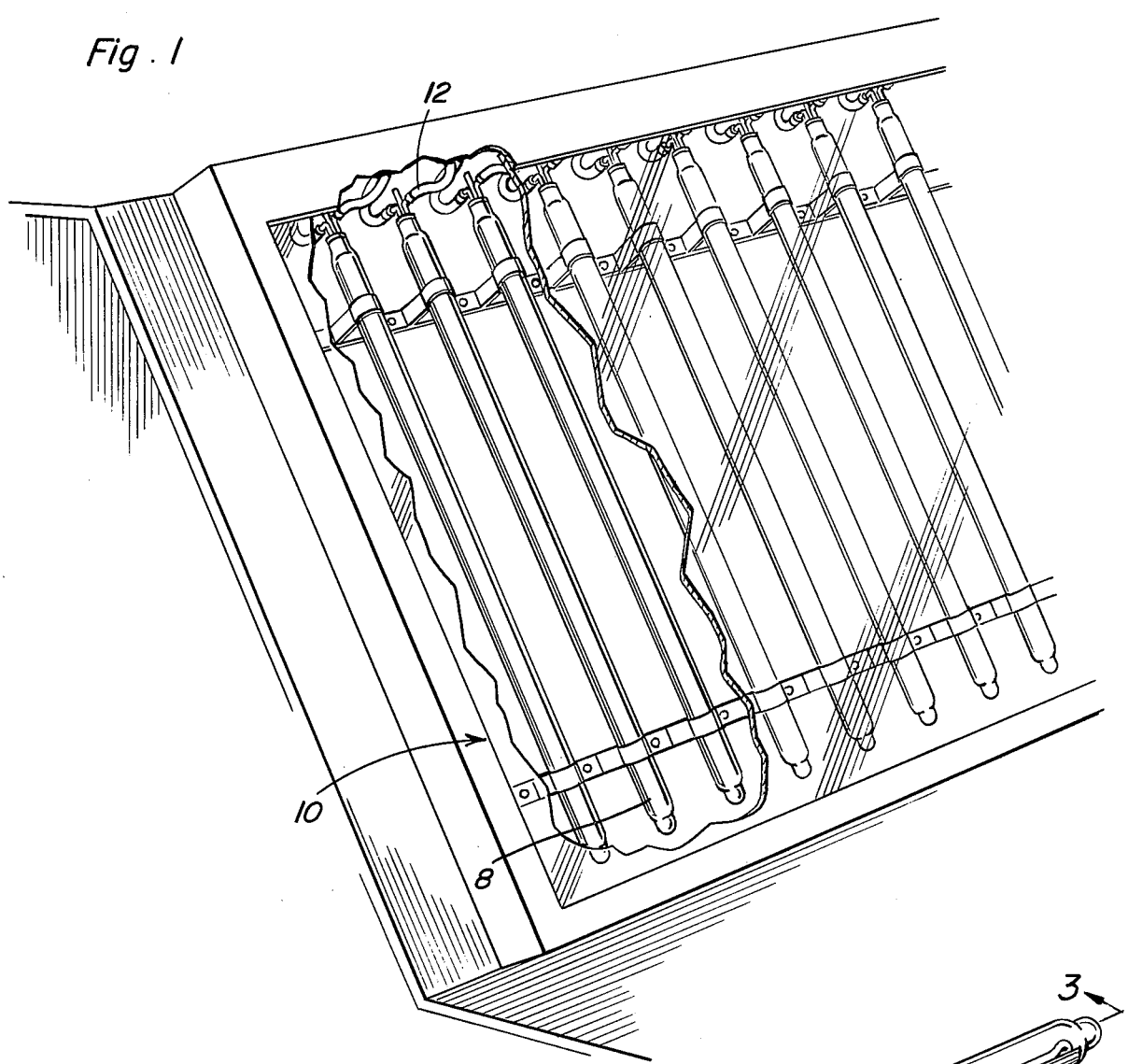
FIG. 1 is a plan view of a solar collecting panel mounted on a support structure.
Figure 2:
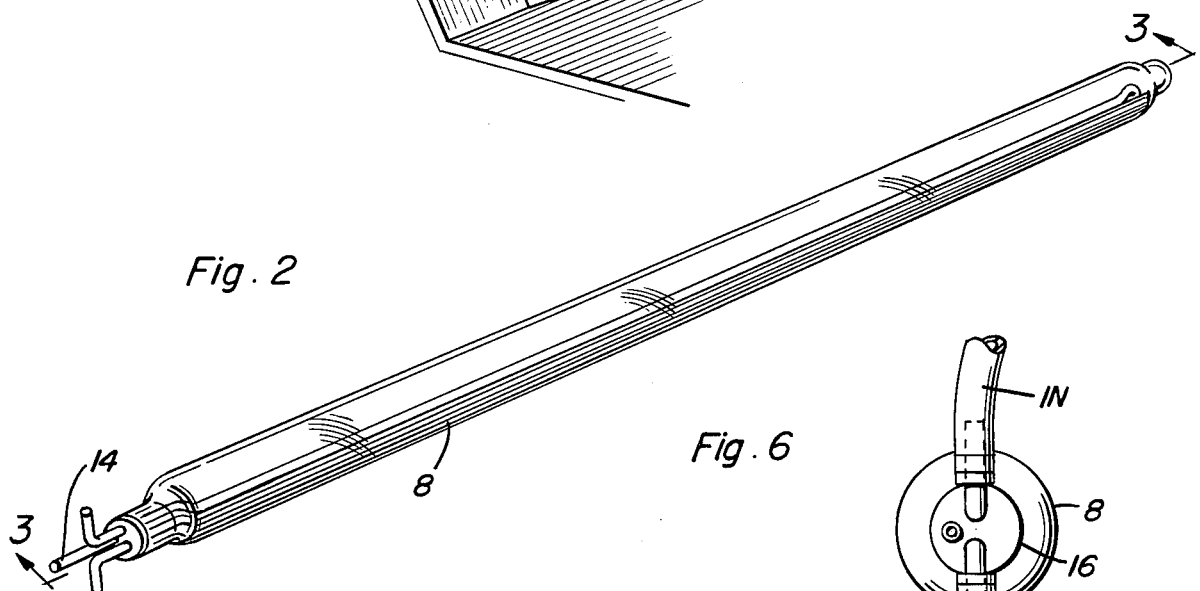
FIG. 2 is a plan view of an individual collector tube with the process tube for evacuating the collector still in place.
Figure 6:
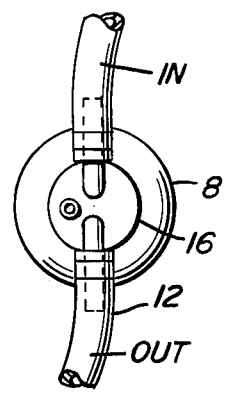
FIG. 6 is the top end view of the intake and outake portions of the fluid circulating tube system.

Referring now to the drawings in detail wherein like reference characters indicate like parts throughout the several figures, the reference numeral 10 indicates generally a solar collector panel which consists of a number of collecting tubes each having an outer evacuated glass jacket 8, which encases heat absorption fluid circulating tubes 12 which are serially connected in the panel, see FIG. 1. A process tube 14 used for evacuating the glass jacket, is shown in FIGS. 2 and 3, before it is burned off when the neck 16 of the jacket is sealed after the vacuum is achieved. The vacuum is of a high order, (4 × $10^{-6}$ $^1$ Torr.) which virtually eliminates the convection mechanism of heat loss. The main body of the glass jacket is cylindrical in configuration and about 112 centimeters in length, the neck of the jacket is additionally 75 millimeters long and the opposite diminished rounded end 20 is 50 millimeters in length. The absorption tube 12 which has a diameter of 19 millimeters as compared to 100 millimeters of the cylindrical jacket enters the neck of the cylinder and is offset to extend the length of the main portion of the cylinder in proximity to and parallel with the wall of the cylinder. The tube 12 is doubled over upon itself short of the rounded end 20 to lie as close to itself as possible without contact, The egress tube parallels the ingress tube for the length of the cylinder and is similarly offset to exit the neck of the jacket. In FIGS. 1 and 6 insulating sleeves are shown encasing the connecting portions of the tubes 12.

The doubled over humped turnaround bight of tube 12 is shown in FIG. 1 and indicated as 13. A curved glass support and positioning means 24 has three arched portions connected together with the free ends of each secured one to the humped turn of the circulating tubing, and the other two, designated 26, to opposed walls 18 of the diminished end 20. All members described, the jacket, heat absorption tubing and support and positioning members are made of borosilicate glass. There are no interfaces of dissimilar materials to dissipate the heat.

There are three ways to blacken the heat absorption tubing. The circulation fluid may be blackened by means of dyes or colloidal suspensions such as lampblack, graphite or charcoal in a water base. Anti-freeze and other agents may be added to the fluid. A black coating on either the outer or inner surface of tube 12 would provide another means of achieving heat absorption.

An aluminum coating is placed upon the inner surface of the cylindrical jacket extending the length of the main portion thereof and having a lateral extent of half the circumference of the jacket. This coated surface constitutes a concave cylindrical mirror for the reflection of entering light rays to focus them on the absorption tubing. The absorption tubing is placed along the principal axis of the concave reflecting mirror at the focus of the light reflected from the mirror. Parallel rays of light entering the cylindrical tubing will be slightly converged by the convex surface of the jacket and the focusing of the reflected light from the concave mirror will be closer to the mirror than the principal focus and will extend the length of the mirror. Some of the entering rays of light will strike the inner absorption tubes directly and be absorbed, but others will be directed to the mirror and refocused on the inner absorption tubing. Some of the radiation will scatter and exit the glass cylinder. The doubling of the absorption tubing will extend it a distance of over forty millimeters deep into the jacket along the primary axis of the concave mirror. This depth will allow the upper portion to capture scattered radiation. By necking the cylinder, the absorption tubing will retard scattered radiation and serve as additional insulation in that area. To further minimize the loss of scattered radiation, a one way light transmitting coating, known in the glass art, may be applied to the inner surface of the jacket. Such one way transparent coating would allow light to pass uni-directionally into the cylinder but not out. These coatings may act as a second reflecting surface bouncing back scattered radiation and retaining it within the collector tube.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A glass solar energy collector tube comprising an outer cylindrical evacuated jacket having a reflective coating on its inner surface extending approximately half the circumference of the jacket and constituting a concave mirror, inner glass absorption tubing circulating heat storing fluid in and out of the jacket, said tubing lying in the focal plane of the concave reflecting surface, glass connecting means between the outer jacket and inner tubing to support and position the tubing within the jacket, and blackening means associated with the inner tubing to increase the absorption of heat energy, the jacket comprising a main elongated cylindrical body portion having a central longitudinal axis, a sealed necked entry portion coaxial with the longitudinal axis, and a diminished rounded end, and the reflecting surface extending the length of the main elongated cylindrical body portion of the jacket, the absorption tubing for circulating the heat storing fluid entering through the sealed entry of the jacket and being offset in the main body portion, extending nearly the length of the main body portion of the jacket, and doubling over upon itself, an ingress leg of the absorption tubing lying along the principal axis of the concave mirror and an egress leg of the inner tubing paralleling the ingress leg of the tubing between the ingress leg of the inner tubing and the longitudinal axis of the body portion of the jacket for capturing scattered radiation and being similarly offset to exit the sealed necked entry of the jacket.

2. A glass solar energy collector tube as in claim 1, wherein the glass jacket is coated on its inner surface exclusive of the mirrored surface with a one way light transmitting substance which will transmit light from outside the jacket but will prevent transmission in the opposite direction.

3. A glass solar energy collector tube as in claim 2, wherein the reflective coating is aluminum.

4. A glass solar energy collector tube as in claim 3, wherein the blackening means comprises a black opaque fluid circulating in the inner glass tubing.

5. A glass solar energy collector tube as in claim 3, wherein the blackening means comprises a black coating on the surface of the inner tube.

6. A glass solar energy collector tube as in claim 5, wherein the black coating is on the inner surface of the inner circulating tube.

7. A glass solar energy collector tube as in claim 5, wherein the black coating is on the outer surface of the inner tube.

* * * * *